United States Patent
Di Battista

[11] 3,842,656
[45] Oct. 22, 1974

[54] DETERMINING PARTICLE DENSITY USING KNOWN MATERIAL HUGENIOT CURVES

[75] Inventor: John D. Di Battista, Newport News, Va.

[73] Assignee: The United States of America as represented by the Administrator of the National Aeronautics and Space Administration, Washington, D.C.

[22] Filed: June 5, 1973

[21] Appl. No.: 367,294

[52] U.S. Cl. ............................ 73/32 R, 73/432 PS
[51] Int. Cl. ............................................ G01n 9/00
[58] Field of Search... 73/32, 12, 11, 170 R, 432 PS

[56] References Cited
UNITED STATES PATENTS

| | | | |
|---|---|---|---|
| 3,407,304 | 10/1968 | Kinard et al. | 73/12 X |
| 3,587,291 | 6/1971 | Escallier | 73/170 R X |
| 3,605,482 | 9/1971 | Humes | 73/12 |

Primary Examiner—Richard C. Queisser
Assistant Examiner—Stephen A. Kreitman
Attorney, Agent, or Firm—Wallace J. Nelson; Howard J. Osborn; John R. Manning

[57] ABSTRACT

A method is detailed to determine the density of particles wherein the closing velocity is known between the impacting particles and a plate of known material. Either the shockwave velocity or the material velocity produced in the plate upon impact by an unknown material particle is determined and compared with the corresponding shockwave or material velocity that would be produced by different known material particles having the same closing velocity upon impact with the plate. The unknown material particle density is derived by obtaining a coincidence of the shockwave velocity or material velocity conditions initially produced upon impact between the known material plate and one of the different material particles and from the fact that shockwave velocity and material velocity are ordered on the impacting particle material density alone.

2 Claims, 19 Drawing Figures

T = 0

T = T

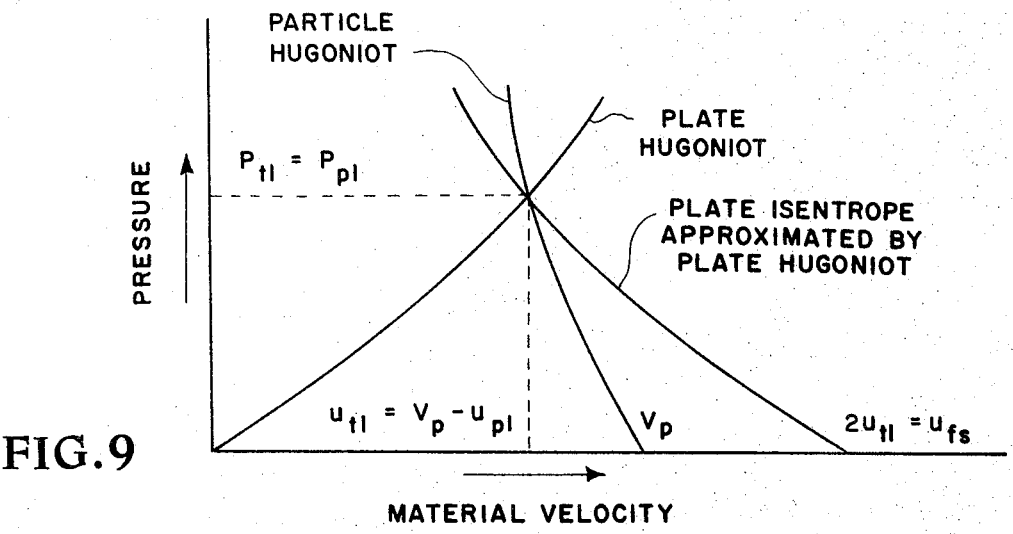
FIG. 9
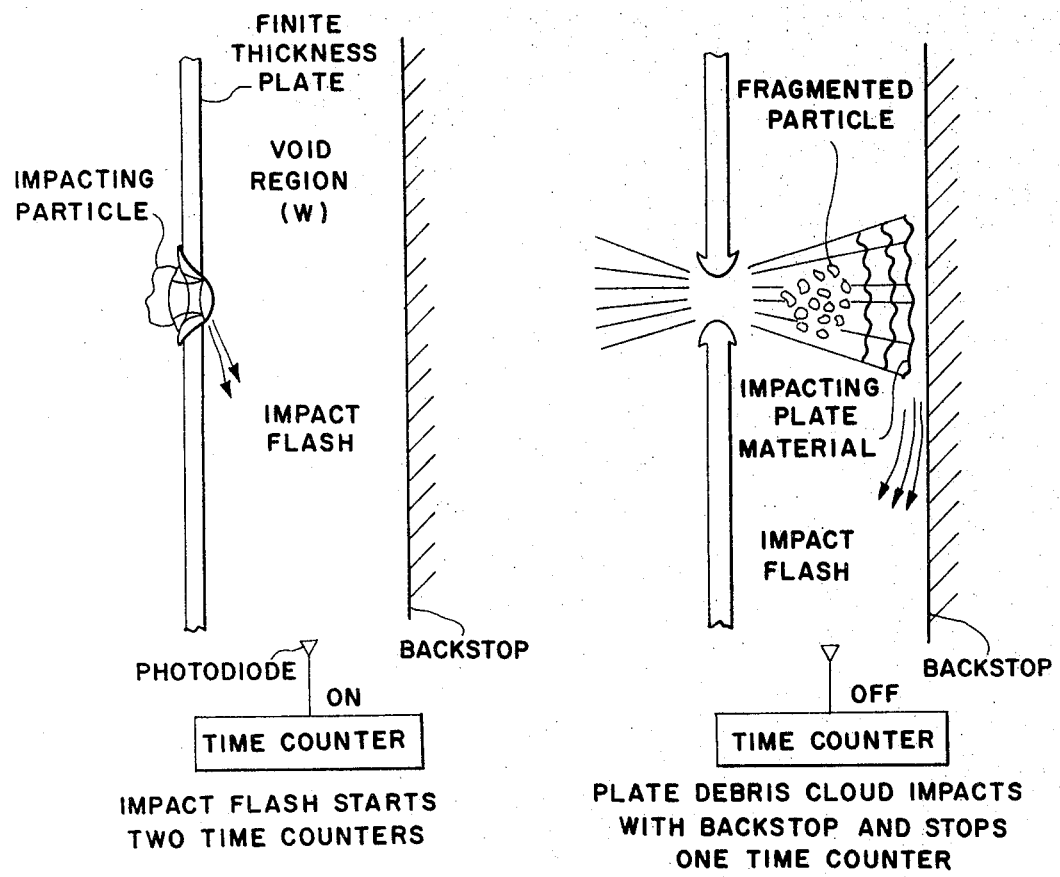
FIG. 10a
IMPACT FLASH STARTS
TWO TIME COUNTERS
FIG. 10b
PLATE DEBRIS CLOUD IMPACTS
WITH BACKSTOP AND STOPS
ONE TIME COUNTER MATERIAL AND FREE SURFACE VELOCITIES PRODUCED IN A BERYLLIUM PLATE
IMPACTED BY VARIOUS MATERIAL PARTICLES $V_p = .7$ cm/microsec

| PARTICLE MATERIAL | TARGET MATERIAL | $u_{tl}$ cm/microsec | $u_{fs}$ cm/microsec | $u_{fs}/V_p$ | $u_{fs}$ cm/microsec | $u_{fs}/V_p$ |
|---|---|---|---|---|---|---|
| GOLD | BERYLLIUM | .557 | 1.114 | 1.591 | | |
| IRON | " | .486 | .972 | 1.388 | | |
| IODINE | " | .404 | .808 | 1.154 | | |
| ALUMINUM | " | .382 | .764 | 1.091 | | |
| BERYLLIUM | " | .350 | .700 | 1.000 | | |
| MAGNESIUM | " | .307 | .614* | .877* | .677+ | .967+ |
| CARBON DIOXIDE | " | .273 | .546* | .780* | .630+ | .900+ |
| WATER | " | .232 | .464* | .663* | .573+ | .818+ |

\* AFTER ONE SHOCK AND ONE EXPANSION WAVE TRANSIT

+ AFTER TWO SHOCKS AND TWO EXPANSION WAVE TRANSITS

FIG.17

DETERMINING PARTICLE DENSITY USING KNOWN MATERIAL HUGENIOT CURVES

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

1. Field of the Invention

The invention relates to the determination of the density of particulate matter, and has particular use with spacecraft.

2. Description of the Prior Art

It is often necessary to determine the constituents and density of the individual particles, in space, in addition to the mass distribution of particulate matter. Properly designed spacecraft meteoroid shielding utilizing the meteoroid bumper concept depends inter alia on the density of meteoroid particles.

Any practicable device used to determine the density of particles must be simple, lightweight and compact in order to be placed on small unmanned exploratory spacecraft. Prior art devices are based on either capturing the particle and conducting an examination of it, or using a spectrograph to determine the particle constituents from an impact flash generated when a particle collides with the spacecraft.

SUMMARY OF THE INVENTION

The instant application relates to the determination of the density of all known velocity cosmological material. There is at this time no prior art, previous methods or devices performing the function of the instant application.

The invention provides a simple, compact and lightweight device because only one velocity measurement must be made. This velocity measurement can be made by recording impact flashes which impinge on a photodiode. In addition, the instant invention can be fully integrated with any capture device, and is also completely complementary to any spectrograph system as outlined below, in the following sense. With a spectrograph the elements in the particle and their relative amount are determined. Calculation, assuming a solid homogeneous particle, would then yield the particle density. In the instant invention, density is determined and calculation used to determine its principal constituents. For particles containing voids produced, for example, in the accreted particles in the asteroid belt, simultaneous measurements of the particle constituents by spectrograph, and the particles density by devices described here, are needed to have an adequate description of the impacting particle.

BRIEF DESCRIPTION OF THE DRAWINGS

FIG. 9 shows the impact pressure and particle velocity produced by high speed impact and maximum spray velocity produced for the case $\bar{p}_{po} > \bar{p}_{to}$;

FIGS. 10a and 10b show a means to measure debris cloud velocity;

FIG. 17 is a table of the material and free surface velocities produced in a beryllium plate impacted by particles of various materials.

DETAILED DESCRIPTION OF THE INVENTION

In the method of the invention, density is determined and calculations are made to determine the principal constituents. One restriction is that the particle closing velocity must be less than 2 cm/microsec., in order that particle and spacecraft surface not vaporize when one of the devices proposed here is utilized. In addition, one other restriction is that the closing velocity be known. The closing velocity is a known quantity in certain applications, as for example, in determining particle density in the heads of comets such as the d'Arrest comet, for particles in the asteroid belt, and particles in orbit about such planets as Jupiter and Saturn. If the particle-spacecraft closing velocity is known, the angle of particle impact with a spacecraft surface is also known and can be controlled.

SYMBOLS

C — isentropic speed of sound
W — void width between a thin plate and a backstop
F — impact flash
$l$ — right circular cylinder length
L — characteristic length of meteoroid
P — pressure
R — expansion wave
S — shockwave $h$ — plate thickness
$T$ — time
$u$ — material velocity $$u_{tl}\,[a_t, B_t, \bar{p}_{to}, a_p, B_p, \bar{p}_{po}, V_p] = (-[a_t\bar{p}_{to} + a_p\bar{p}_{po} + 2B_p\bar{p}_{po}V_p] +$$

$$[(a_t\bar{p}_{to} + a_p\bar{p}_{po} + 2B_p\bar{p}_{po}V_p)^2 + 4(B_t\bar{p}_{to} - B_p\bar{p}_{po})(a_p\bar{p}_{po}V_p + B_p\bar{p}_{po}V_p^2)]^{1/2})\,[2(B_t\bar{p}_{to} - B_p\bar{p}_{po})]\,;\,(B_t\bar{p}_{to} - B_p\bar{p}_{to}) \neq 0$$

$U$ — shockwave velocity
$V_p$ — particle velocity normal to plate surface
$\bar{p}$ — density
$w$ — right circular cylinder width
$W$ — characteristic width of meteoroid
$X$ — position along impact axis
$a$ — material constant (cm/microsec.)
$B$ — material constant (dimensionless)
$E$ — characteristic meteoroid surface roughness length
$\Delta T$ — time after impact
$\theta$ — angle

Figure 1:
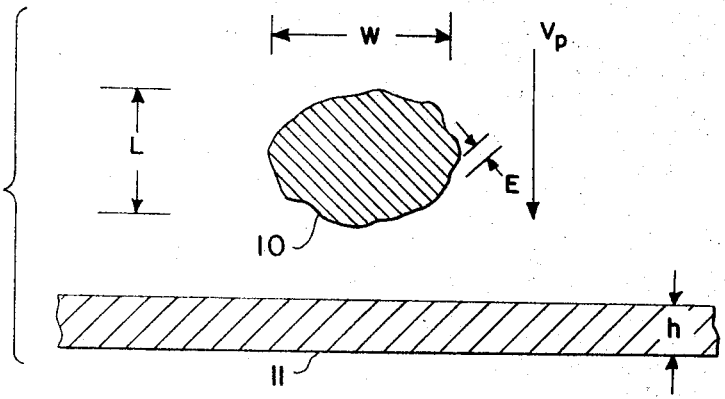
FIG. 1 shows the impending impact between a particle having a known velocity and a plate of finite thickness.

Subscripts $0$ — state of material originally
$1$ — state of material after first shockwave passage or first shockwave and expansion wave passage
$2$ — state of material after second shockwave passage or second shockwave and expansion wave passage
$3$ — state of material after third shockwave passage or third shockwave and expansion wave passage
$p$ — particle
$t$ — plate
$tr$ — pertaining to expansion wave from plate rear surface
$fs$ — pertaining to plate rear surface
$max$ — pertaining to a maximum
$min$ — pertaining to a minimum It is necessary to consider in detail the actual collision process which occurs when a hypervelocity particle impacts a finite thickness target. Because the angle at which a particle impacts a spacecraft surface can be controlled, only normal, or perpendicular, impacts will be considered as occurring. FIG. 1 shows the conditions present prior to impact of a known velocity particle 10 and a finite thickness plate 11.

The particle has characteristic length L, width W, surface roughness length E, and the plate has thickness h. Consideration will be limited to impact cases such that $$E < h < \min(L, W).$$

Figure 2:
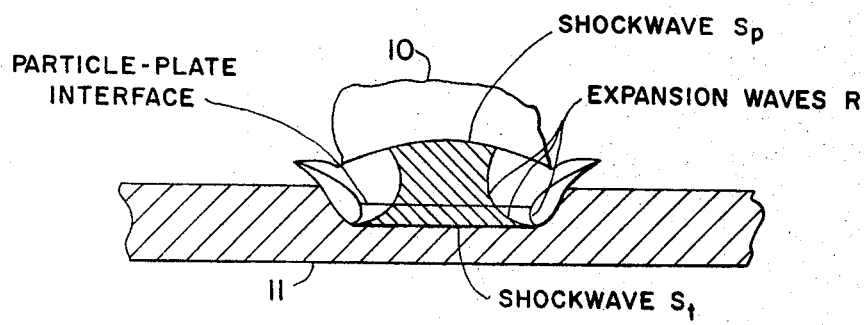
FIG. 2 shows the conditions present in the particle and plate of FIG. 1, shortly after impact.

Upon particle-thin plate impact, a strong shockwave, $S_t$, is driven into the plate as shown in FIG. 2 and another shockwave $S_p$ is driven back into the particle. The momentum equations (2nd Rankine-Hugoniot relation) across the plate and particle shockwaves written relative to the undisturbed plate and particle materials are $$P_{tl} = \bar{p}_{to} U_t u_{tl} \tag{1}$$

$$P_{pl} = \bar{p}_{po} U_p u_{pl} \tag{2}$$

where $o$ subscripts denote the undisturbed material state before shock passage and $1$ subscripts denote the material state after shock passage. In the shaded area of FIG. 2, $P_{tl}$ and $P_{pl}$ are the initially induced impact pressures in the plate and particle material, $\bar{p}_{to}$ and $\bar{p}_{po}$ are the original plate and particle material densities, and $u_{tl}$ with $U_t$ and $u_{pl}$ with $U_p$ are the initially induced compressed material and shockwave velocity for the plate and particle relative to the undisturbed plate and particle material. For solids there exists a linear relation between the shock velocity U and compressed material velocity u of the form $$U = a + B u \tag{3}$$

where a(cm/microsec.) and B (dimensionless) are empirical constants for each material. Substitution of equation (3) into equations (1) and (2) yields two equations $$P_{tl} = \bar{p}_{to}(a_t + B_t u_{tl})\, u_{tl} \tag{4}$$

$$P_{pl} = \bar{p}_{po}(a_p + B_p u_{pl})\, u_{pl}. \tag{5}$$

To connect the pressure and material velocity in each material in the shaded region of FIG. 2, it may be noted that across any part of the particle-plate interface, for example, A–B as we are interested in the initially induced impact states, Newton's Second Law holds and there is no interpenetration of one material into another. This implies that $$P_{tl} = P_{pl} \tag{6}$$

and $$u_{tl} = V_p - u_{pl} \tag{7}$$

Equating equations (4) and (5) through equation (6) and noting from equation (7) that $$u_{pl} = V_p - u_{tl} \tag{8}$$

one may solve for $u_{tl}$ as a function of impact velocity if both particle and plate materials are known as follows:

$$\bar{p}_{to}(a_t + B_t u_{tl})u_{tl} = \bar{p}_{po}(a_p + B_p[V_p - u_{tl}])\,(V_p - u_{tl})$$

which leads to the quadratic $$(B_t\bar{p}_{to} - B_p\bar{p}_{po})\,u_{tl}^2 + (a_t\bar{p}_{to} + a_p\bar{p}_{po} + 2B_p\bar{p}_{po}V_p)\,u_{tl} - (a_p\bar{p}_{po}V_p + B_p\bar{p}_{po}V_p^2) = 0$$

which may be solved taking the plus sign of the quadratic as $$u_{tl} = \frac{-[a_t\bar{p}_{to} + a_p\bar{p}_{po} + 2B_p\bar{p}_{po}V_p] + [(a_t\bar{p}_{to} + a_p\bar{p}_{po} + 2B_p\bar{p}_{po}V_p)^2 + 4(B_t\bar{p}_{to} - B_p\bar{p}_{po})(a_p\bar{p}_{po}V_p + B_p\bar{p}_{po}V_p^2)]^{1/2}}{2(B_t\bar{p}_{to} - B_p\bar{p}_{po})}$$

$$= V_p - u_{pl};\ (B_t\bar{p}_{to} - B_p\bar{p}_{po}) \neq 0 \tag{9}$$

Using equations (9) and (4), $P_{tl}$ as a function of $V_p$ may also be solved for with the result $$P_{tl} = P_{pl} = \bar{p}_{to}[a_t + B_t u_{tl}(a_t, B_t, \bar{p}_{to}, a_p, B_p, \bar{p}_{po}, V_p)] \times u_{tl}(a_t, B_t, \bar{p}_{to}, a_p, B_p, \bar{p}_{po}, V_p). \quad (10)$$

With equations (9) and (10) one can calculate the initial pressure and compressed material velocity produced, knowing the particle and plate materials and the closing velocity.

Figure 3:
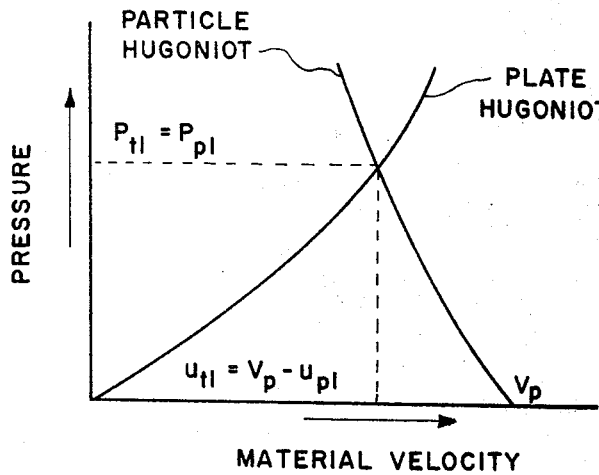
FIG. 3 illustrates a graphical procedure for determining the pressure and material velocity of particle and plate during impact.

There is, however, a graphical procedure which may be used to determine the pressure and compressed material velocity produced. First, Hugoniot curves [equations of the same form as equation (4)] are calculated for the plate and particle materials. On a plot (FIG. 3) which has pressure on the ordinate and material velocity on the abscissa, the Hugoniot curve $P_{tl} = P_{tl}(u_{tl})$ is plotted starting at $u_{tl} = 0$, $P = 0$. Starting at the impact velocity $V_p$ on the abscissa and at $P = 0$, the particle Hugoniot is plotted and reflected back through the plate Hugoniot. The intersection of the two Hugoniots gives the pressure and material velocity initially produced in the particle and plate through impact. Thus the plot says an element of plate material initially at rest and at zero pressure is brought through action of a shockwave to some $P_{tl}$ and $u_{tl}$ on the plate Hugoniot. Also, an element of particle material at initial velocity $V_p$ and zero pressure is brought through action of a shockwave to some $P_{pl}$ and $V_p - u_{pl}$. Equations (6) and (7), which specify that $P_{tl}$ and $P_{pl}$ must be the same and $u_{tl} = V_p - u_{pl}$, are precisely the conditions present at the intersection of the normal plate material Hugoniot and the shifted and reflected particle material Hugoniot.

Figure 4:
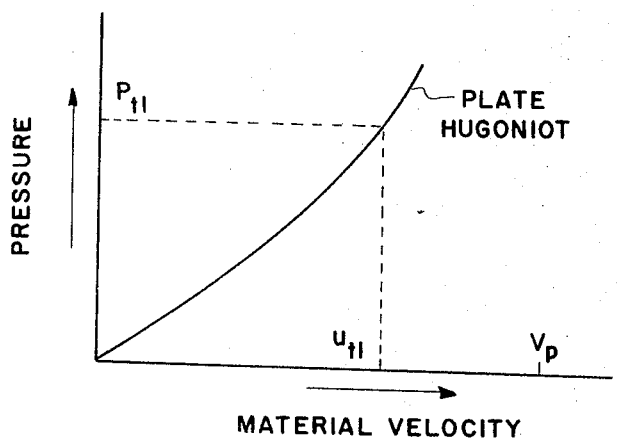
FIG. 4 shows conditions reached in a known material plate impacted by an unknown material particle having a known closing velocity.
Figure 5:
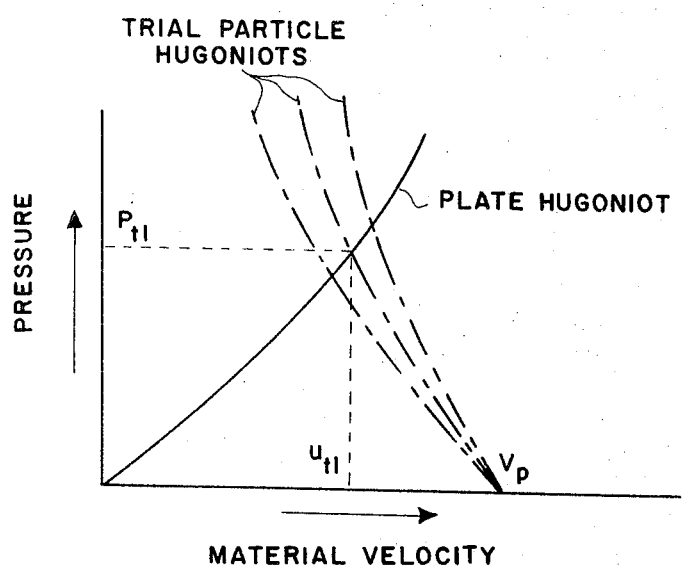
FIG. 5 shows the use of trial Hugoniots in a shifted and reflected technique to determine an unknown particle density.

Now consider the situation as depicted in FIG. 4, assuming the pressure $P_{tl}$ and compressed material velocity $u_{tl}$ which has been produced in a known material plate by impact is known. Assume further that the particle impact velocity is known but the particle material is unknown. To determine the unknown particle density, trial known material Hugoniots shifted to $V_p$ are plotted as shown in FIG. 5.

Figure 6:
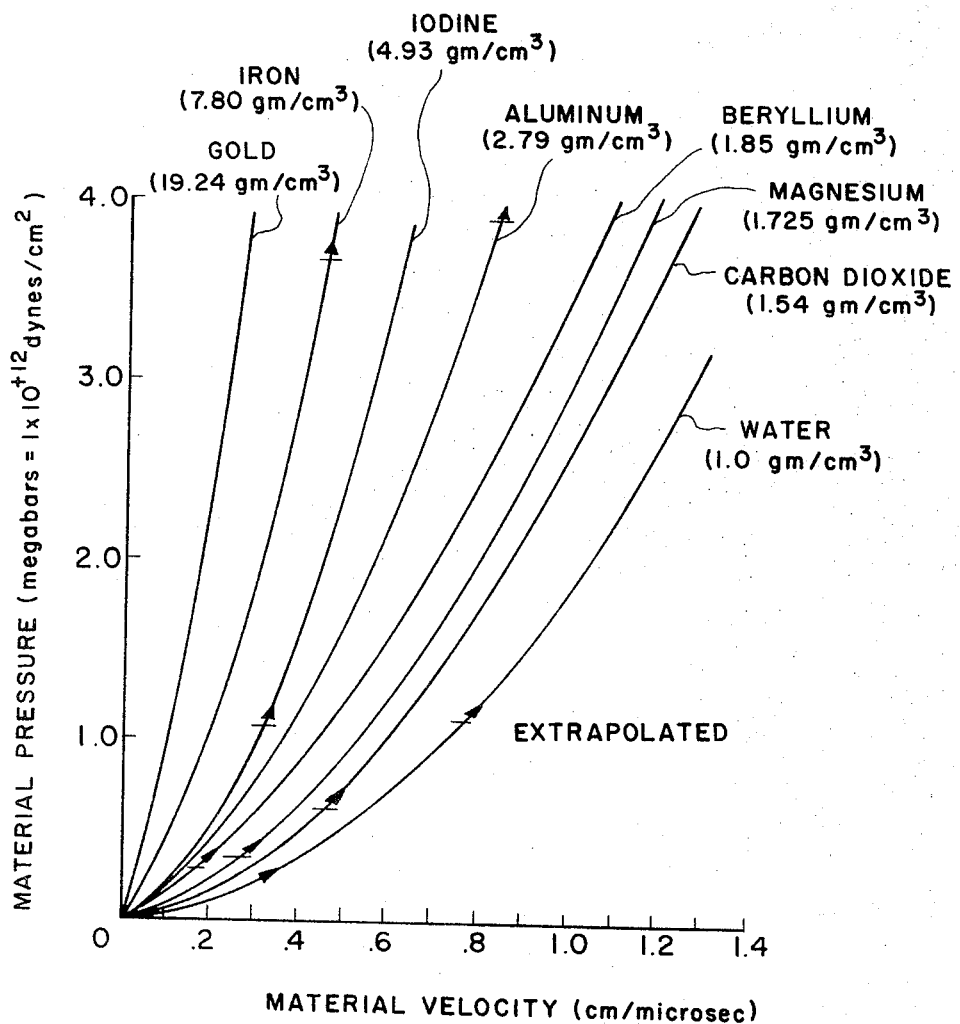
FIG. 6 are Hugoniot curves for a plurality of materials.

The trial Hugoniot which passes through the known $P_{tl}$ and $u_{tl}$ on the plate Hugoniot will give the density of the unknown particle material because it is well known that the Hugoniots are ordered with density alone. FIG. 6, which was obtained from extrapolation of low pressure data supplied in "Shock Waves, High Pressure Physics and Chemistry," Academic Press, pp. 209-291 (1963), by Duvall and Fowles, illustrates this fact. The Hugoniot curves from gold through water may be seen to be ordered on density alone, and various room temperature properties of the materials such as ductility, yield strength, etc., have no effect.

The problem now is to outline how the pressure $P_{tl}$ and compressed material velocity $u_{tl}$ are to be determined. Examination of equation (1) reveals that two quantities, $U_t$, the shockwave velocity in the plate, and $u_{tl}$, the compressed material velocity in the plate, are available for measurement. Equation (3) then reveals that a measurement of either allows the other, as well as $P_{tl}$ to be calculated.

Measurement of $U_t$

A straightforward method of determining $U_t$ would be to record the time, T, it takes the plate shockwave, $S_t$, to propagate through a certain thickness plate h. Then $$U_t = h/T. \quad (11)$$

Figure 7A:
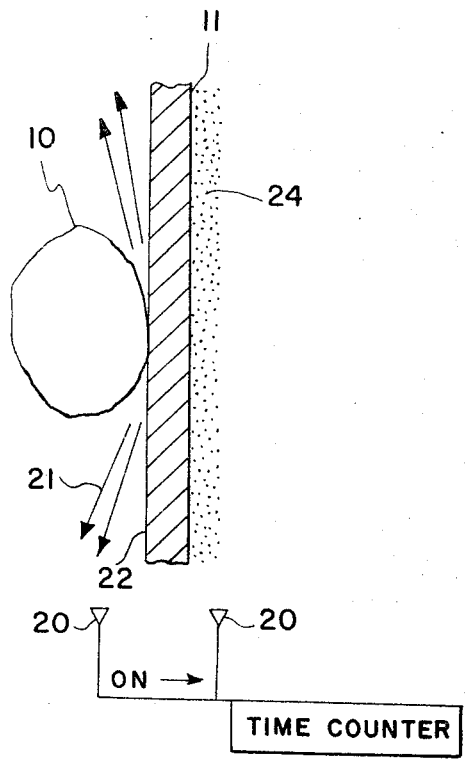
FIGS. 7a and 7b illustrate a means to measure plate shockwave velocity.
Figure 7B:
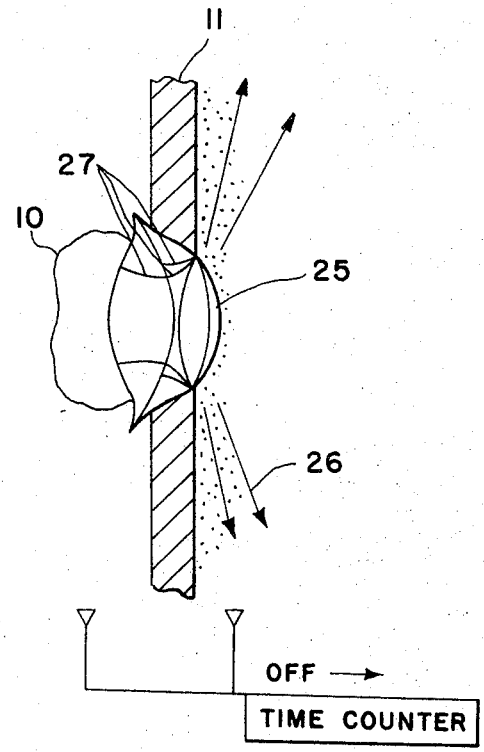

FIG. 7 shows a schematic of a possible device to carry out this measurement.

A photodiode structure 20 is used to record the impact flash 21 on the target front surface 22 and to start a time counter 23. By backing the plate with argon gas 24, a strong shockwave 25 would be driven into the gas when the target shockwave reaches the target rear surface. Strongly shocked argon gas 26 glows brightly and this flash can be sensed by photodiode structure 20 to turn the time counter 23 off. Although the technique is relatively straight forward, it is severely restricted by the expansion waves 27 which originate at the periphery of the particle-plate contact surface. Starting at the periphery of the particle-plate contact surface, these expansion waves decompress the compressed particle and plate materials, and overtake and reduce the initial shockwave velocity in the particle and plate. Any measurement of shockwave velocity must be accomplished in a plate whose thickness is less than the depth at which the total shockfront suffers attenuation. In general the counter 23 must operate on the $1 \times 10^{-9}$ to $1 \times 10^{-10}$ sec. time scale. If this time measurement can be made, there should be no restriction on the density of meteoroids which can be measured with perhaps the sole exceptions of those characterized by a snowflake-type structure.

Measurement of $u_{tl}$

To determine $u_{tl}$, the shockwave $S_t$ must again reach the plate rear surface unattenuated by expansion waves from the side and rear of the particle. Again, the dependence of plate thickness, $h$, on the characteristic width, W, or characteristic length, L, of the particles comes into play. Assuming that $h$ is sufficiently small for the impacting particle, a situation which can be checked and will be considered through example cases examined later, we proceed as follows. Although the expansion waves make a measurement of $U_t$ an extremely difficult affair, in the scheme proposed here, $u_{tl}$ can be measured in an easier manner. When $S_t$ reaches the plate rear surface, an expansion wave (FIG. 8) is reflected back into the compressed plate material.

Now, three separate cases must be considered and these are:

Case I — $\bar{p}_{po} > \bar{p}_{to}$
Case II — $\bar{p}_{po} = \bar{p}_{to}$
Case III — $\bar{p}_{po} < \bar{p}_{to}$ Depending on which of these cases is present, different processes occur in the plate during impact.

Case I $\bar{p}_{po} > \bar{p}_{to}$

For this case, let us start by developing an inequality involving the plate compressed material velocity, $u_{tl}$, and the impacting particle velocity $V_p$. For $\bar{p}_{po} > \bar{p}_{to}$ and equation (6) we have, examining FIG. 6

$$u_{tl} > u_{pl} \tag{12}$$

Therefore, substituting inequality (12) into equation (7), we have the following inequality:

$$u_{tl} > V_p - u_{tl} \tag{13}$$

which may be rearranged to the following forms $$2u_{tl} > V_p \text{ or } u_{tl} > V_{p/2} \tag{14}$$

Figure 8:
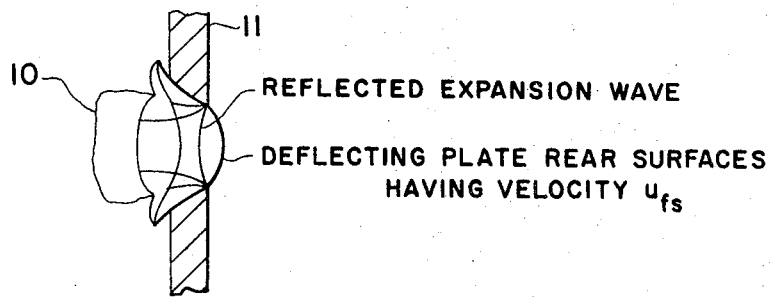
FIG. 8 shows the conditions of a finite thickness plate, with a reflected expansion wave from plate rear surface.

Again, FIG. 8 illustrates the situation present in the plate after the shockwave, $S_t$, arrival at the plate rear surface. Because of the zero pressure boundary condition at the plate surface, an expansion wave is propagated back into the compressed plate material decompressing and accelerating this material giving it an additional velocity component $u_{tr}$. As the plate material already has velocity $u_{tl}$, the maximum velocity of material emanating from the plate rear surface (i.e., the maximum velocity of the spray, $u_{fs}$) is given as follows:

$$u_{fs} = u_{tl} + u_{tr} \tag{15}$$

It is well known that for solids, $u_{tr}$ can be taken as $$u_{tr} = u_{tl} \tag{16}$$

with only a small error present for moderate compressions. Therefore, using this result the substitution of (16) into (15) and rearranging for $u_{tl}$ yields $$2u_{tl} = u_{fs} \text{ or } u_{tl} = u_{fs}/2. \tag{17}$$

Now using equation (17) and inequality (14) an important observation may be made concerning the relative magnitudes of the maximum spray velocity, $u_{fs}$, and the impacting particle velocity as shown in the following expression:

$$u_{fs} = 2u_{tl} > V_p \tag{18}$$

which yields the inequality $$u_{fs} > V_p. \tag{19}$$

Inequality (19) says that the maximum spray velocity for the target material is greater than the impacting particle velocity. In other words, the plate material after impact disengages from the particle material. If the time, $T_t$, it takes this plate material to traverse a known void region of width W is measured then $u_{fs}$ would be calculated from $$u_{fs} = W/T_t \tag{20}$$

Once $u_{fs}$ is measured $u_{tl}$ can be obtained through equation (17). To further our understanding of the impact situation discussed here for $\bar{p}_{po} > \bar{p}_{to}$ consider the following graphical interpretation of the impact with reference to FIG. 9.

The intersection of the plate and particle Hugoniots gives the pressure $P_{tl} = P_{pl}$ and compressed material velocity $u_{tl}$ generated by the impact. A decompression of the material by the expansion wave, FIG. 8, from the plate rear surface is along an isentrope. If the isentrope is approximated by the material Hugoniot, which is what is implied by equation (16), then simply reflecting the plate material Hugoniot through the plate-particle Hugoniot's intersection will yield the free surface velocity, i.e., the maximum spray velocity $u_{fs}$ achieved through a shock compression and subsequent isentropic expansion. That $u_{fs}$ is twice $u_{tl}$ is obvious from this procedure. FIG. 10 is a schematic of a device which allows the measurement of $u_{fs}$ to be made, and FIG. 11 is a time trace of the light level which might impinge on the photodiode of FIG. 10.

Figure 11:
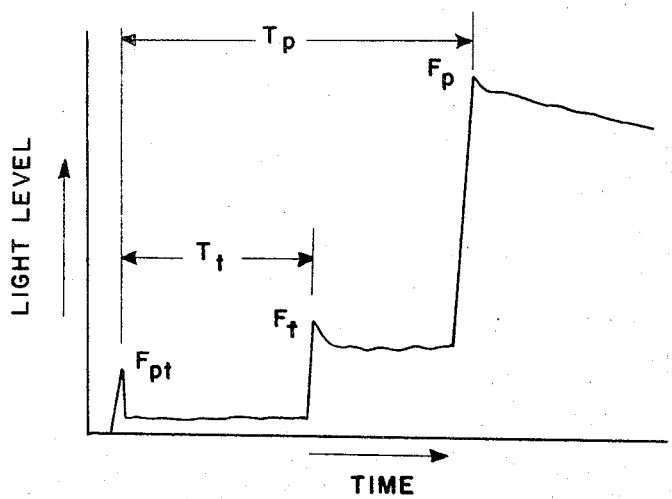
FIG. 11 is a graph of light level versus time for the photodiode shown in FIGS. 10a and 10b, when $\bar{p}_{po} > \bar{p}_{to}$.

When the particle penetrates the first finite thickness plate, FIG. 10(a), the photodiode can record the light emission $F_{pt}$ shown on FIG. 11. When the maximum velocity plate material having velocity $u_{fs} > V_p$ impacts the backstop [FIG. 10(b)], a second flash $F_t$ shown on FIG. 11 would be recorded. Division of the width of the void region W by $T_t$, the time interval between $F_{pt}$ and $F_t$, yields $u_{fs}$ by equation (20). From this, $u_{tl}$ can be calculated by equation (17) and the density of the particle determined. The subsequent arrival time of the particle at the backstop would provide a second flash, $F_p$, at the time $T_p$ later than the first flash, $F_{pt}$. Division of $T_p$ into W should yield for a particle more massive than the plate the particle velocity through $$V_p = W/T_p.$$

This second velocity measurement provides an important method of checking the operation of the device because $V_p$ is known.

What has been discussed until now is the ideal operation of the device when a particle sufficiently large impacts a finite thickness plate. As there is no way to discriminate against particles smaller than some mass particle impacting the device, and producing spurious reading, the device must measure or take data which will allow detection of smaller than necessary particle impacts so that we may reject or accept with caution, for bounding purposes only, such data. Several examples will now be considered of nonideal impacts, that is, particles less than some specific necessary size for ideal operation of the device. We shall now see how the second velocity reading (i.e., measurement of $T_p$ and knowing $V_p$) can be used to verify the correctness of the first measurement, $T_t$. Suppose readings of $T_t$ and $T_p$ are such that in the following examples we have Example 1 a. $u_{fs} < V_p$
b. $T_p > W/u_{fs} > W/V_p$

Obviously this reading for the free surface velocity can be rejected because if $p_{po} > p_{to}$, $u_{fs} > V_p$ in contrast to (a) and no use of (b) is actually required.

Example 2 a. $u_{fs} > V_p$
b. $T_p > W/V_p > W/u_{fs}$.

This example shows a finer use of the known impacting particle velocity, $V_p$, through the measurement of $T_p$. We cannot reject the data using (a) because for $\bar{p}_{po} > \bar{p}_{to}$ the inequality (a) is correct. But from (b) we note that $T_p > W/V_p$, which says that the particle was slowed during its passage through the plate. This would indicate that the particle was not massive enough such that one portion of $S_t$ reached the plate rear surface unattenuated to produce the maximum possible $u_{fs}$. We, therefore, can reject this data or more intelligently use it to establish a lower bound on the particle density.

Case II $\bar{p}_{po} = \bar{p}_{to}$

For this case we shall develop an equality involving the plate compressed material velocity, $u_{tl}$, and the impacting particle velocity $V_p$. For $\bar{p}_{po} = \bar{p}_{to}$ and equation (6), we have for any material from FIG. 6

$$u_{tl} = u_{pl} \tag{21}$$

substituting equation (21) into equation (7) we have $$u_{tl} = V_p - u_{tl} \tag{22}$$

which after rearrangement yields $$2u_{tl} = V_p \text{ or } u_{tl} = V_p/2. \tag{23}$$

From equations (17) and (23) we may make the following connection between the maximum spray velocity and the impacting particle velocity:

$$u_{fs} = 2u_{tl} = V_p;\ u_{fs} = V_p. \tag{24}$$

Figure 12:
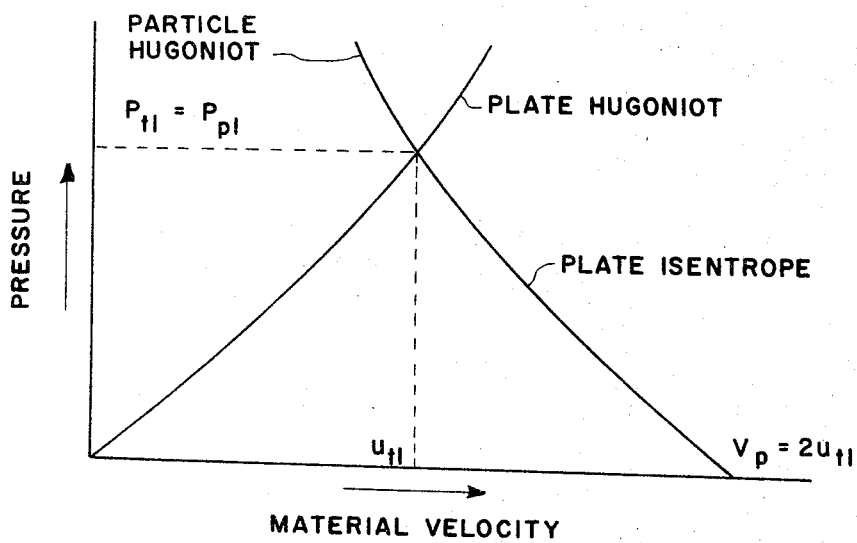
FIG. 12 shows impact pressure, particle velocity and maximum spray density produced for hypervelocity impact when $\bar{p}_{po} = \bar{p}_{to}$.

Equation (23) says that the maximum spray velocity is equal to the impacting particle velocity. FIG. 12 shows graphically the impact situation between a particle and plate of the same density.

The intersection of the plate and particle Hugoniots gives the pressure $P_{tl} = P_{pl}$ and the compressed material velocity $u_{tl}$ generated by the impact. A decompression of the material by the expansion wave, FIG. 8, from the plate rear surface is along an isentrope. By approximating the plate isentrope with its Hugoniot which is the same as the impacting particle Hugoniot, we have at zero pressure that the plate material achieves a final velocity $u_{fs}$, which is the same as the impacting particle velocity $V_p$.

Figure 13:
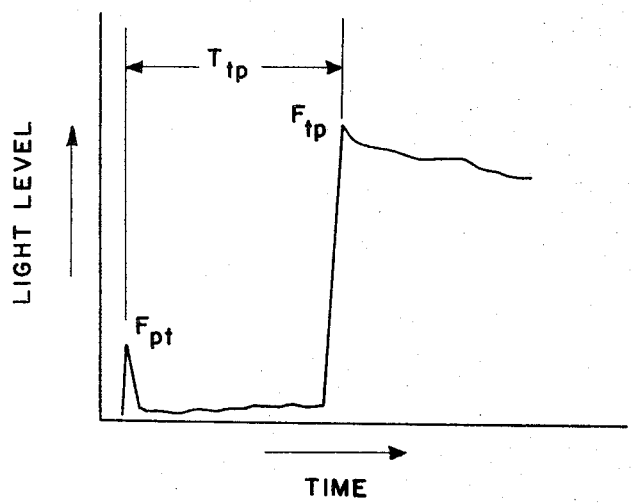
FIG. 13 is a graph of light level versus time for the photodiode shown in FIGS. 10a and 10b, when $\bar{p}_{po} = \bar{p}_{to}$.

Using the device shown in FIG. 10, the photodiode would record a light emission time trace shown in FIG. 13. When the particle penetrates the first thin plate an impact flash $F_{pt}$ will be sensed by the photodiode. When the thin plate material and particle impact the second plate or backstop a second impact flash $F_{tp}$ will be generated. Division of $T_{tp}$ from FIG. 13 into W will give the value of $u_{fs}$ which it should be remembered is $V_p$.

Again we have considered the ideal operation of a device under the conditions $\bar{p}_{po} = \bar{p}_{to}$ where $u_{fs} = V_p$. However, if the projectile is not massive enough so that the thin plate achieves the impacting projectile velocity, we will have the following nonideal example of operation for the device.

Example 1

$$u_{fs} < V_p$$

By knowing $V_p$ and the fact that $u_{fs}$ must equal $V_p$ for $\bar{p}_{po} = \bar{p}_{to}$ we may immediately reject this data.

Case III $\bar{p}_{po} < \bar{p}_{to}$

For this case let us again develop an inequality involving the compressed material velocity and impacting particle. As before, this inequality will be used to gain insight into the events which occur in the plate after impact. For $\bar{p}_{po} < \bar{p}_{to}$ and equation (6) we have, examining FIG. 6, $$u_{tl} < u_{pl}. \tag{25}$$

Substituting (12) into (7) we have the following inequality $$u_{tl} < V_p - u_{tl} \tag{26}$$

which may be rearranged to the following forms, $$2u_{tl} < V_p \text{ or } u_{tl} < V_p/2. \tag{27}$$

Now we have already noted that the maximum spray velocity which can be reached through a single shockwave and expansion wave is $$u_{fs} = 2u_{tl} \tag{28}$$

and equations (27) and (28) indicate that $$u_{fs} = 2u_{tl} < V_p \text{ or } u_{fs} < V_p, \tag{29}$$

Therefore equation (29) indicates that a thin plate of thickness $h$, and $\bar{p}_{to} > \bar{p}_{po}$ has the capability of slowing an infinitely large particle. Obviously, this situation is not possible, and what must happen is that the thin plate material assumes the velocity of a more massive particle. The process by which the plate material assumes the final terminal velocity $V_p$ is by successive shock waves and expansion waves.

Figure 14:
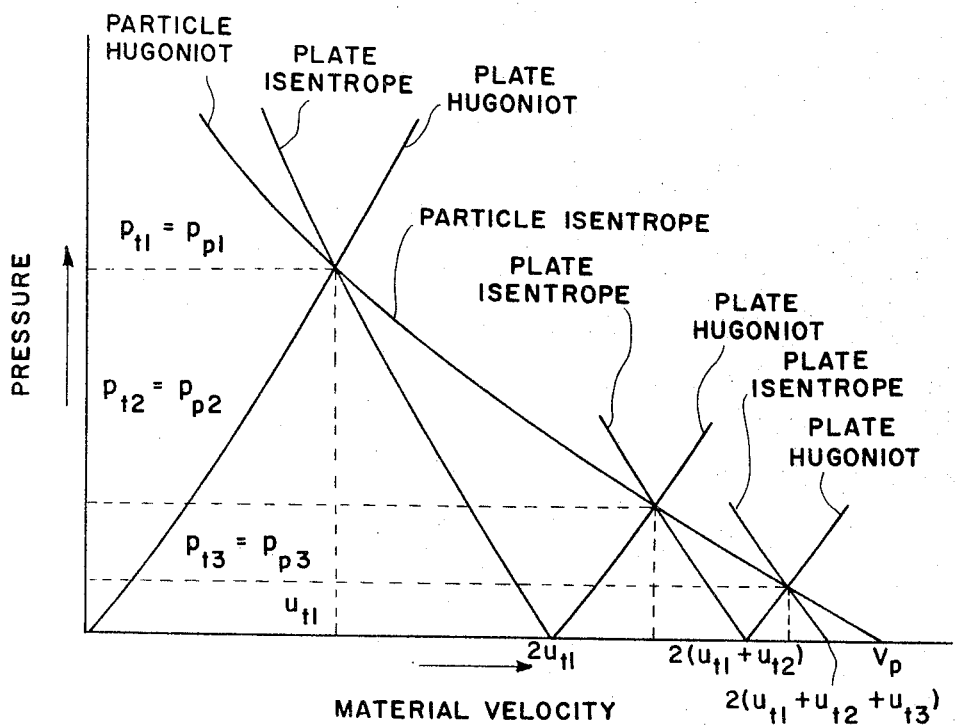
FIG. 14 shows impact pressures and plate velocities produced during successive shockwave and expansion wave passages, when $\bar{p}_{po} < \bar{p}_{to}$.

Consider FIG. 14 and a massive particle impacting a thin plate. Immediately after impact the state in the compressed particle and plate is given by the intersection of the particle and plate Hugoniots at $P_{tl}$ and $u_{tl}$. With the arrival of the shockwave $S_t$ at the plate rear surface, a reflected expansion wave occurs. If the plate Hugoniot is used to approximate the plate isentrope, the plate material relaxes to zero pressure and a velocity $2u_{tl}$. The particle material would relax back to zero pressure and velocity $V_p$. However, from equation (27) we know that $2u_{tl} < V_p$.

What we have now is a plate having velocity $2u_{tl}$ being impacted again by a particle having velocity $V_p$. On FIG. 14 such an impact may be represented by starting the plate Hugoniot at pressure zero, and velocity equal to $2u_{tl}$. The intersection of this Hugoniot with the particle Hugoniot gives the new pressure, $P_{t2}$, and material velocity $2u_{tl} + u_{t2}$ induced in the plate by a second shockwave. Reflection of this shockwave as an expansion wave from the plate rear surface will generate a second reflected expansion wave. Again approximating the plate isentrope by the plate Hugoniot, that is reflecting the plate Hugoniot through $P_{t2}$ and $2u_{t1} + u_{t2}$, we see that the expansion wave again releases the material pressure back to $P = O$ but the material velocity is now $2(u_{t1} + u_{t2})$. The particle at this time also relaxes to $P = O$ but velocity $V_p$ where $$V_p > 2(u_{t1} + u_{t2}). \tag{30}$$

In the same manner as has been done before, we may consider a third impact between a particle moving at velocity $V_p$ and a plate having velocity of $2(u_{t1} + u_{t1})$. From such successive shocks and expansion waves, we see that the thin plate asymptotically approaches the particle velocity.

For $\bar{p}_{po} < \bar{p}_{to}$ then $u_{fs} = V_p$ is the proper conclusion for the maximum spray velocity for a particle more massive than the amount of plate material removed.

Figure 15:
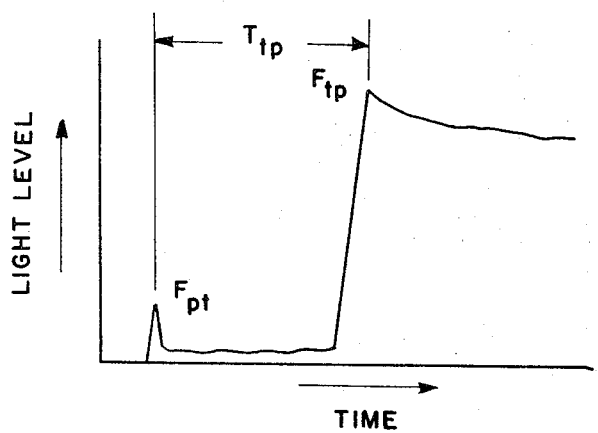
FIG. 15 is a graph of light level versus time for the photodiode shown in FIGS. 10a and 10b, when $\bar{p}_{po} < \bar{p}_{to}$.

During the operation of the device shown in FIG. 10, the light level impinging at the photodiode should be similar to that depicted in FIG. 15.

The first flash $F_{pt}$ would be the impact flash seen at the rear surface of the first thin sheet. The second flash $F_{tp}$ would be the impact flash due to plate and particle material impacting the backstop. Now, if the particle is sufficiently massive as compared to the amount of material removed from the plate division of $T_{tp}$, the time between $F_{pt}$ and $F_{tp}$ into W should yield $$V_p = W/T_{tp} \tag{31}$$

As previously done, we have discussed the ideal operation of the device for a projectile sufficiently massive that the system operated as planned. To consider how the system will allow us to reject data produced by the smaller than required particle, we need only consider one example.

Example 1

$u_{fs} = W/T_{tp} < V_p$

We see we can immediately reject the data because for $\bar{p}_{po} < \bar{p}_{to}$ only if $u_{fs} = V_p$ can we be sure $\bar{p}_{po} \leq \bar{p}_{to}$ as Case I, example 1, and Case II, example 1, will also produce a $u_{fs} < V_p$ if the particle is less in magnitude than the required particle even though $\bar{p}_{to} \geq \bar{p}_{po}$.

For Case I impacts discussed, the system could be used to determine the particle density. However, for Case III impacts, the same system (remembering Case II impacts) will only indicate that $\bar{p}_{po} \leq \bar{p}_{to}$ but not the value of $\bar{p}_{po}$. Certainly this situation indicates that one would select plate materials of the lowest possible density for use in the device. Then, certainly, even knowing $\bar{p}_{po} \leq \bar{p}_{to}$ would be information having engineering and scientific significance.

In Case III discussed heretofore, the desirability of using the lowest density material available to construct the first thin plate, for a metal plate either beryllium or magnesium, was noted. To illustrate, assume beryllium is used as the thin plate material. What will be of concern is the maximum beryllium material spray velocity when particles having greater or equal density impact. In addition, for impacting particles having densities less than the beryllium plate, the beryllium plate velocity after two shock and expansion wave transits will be determined.

Figure 16:
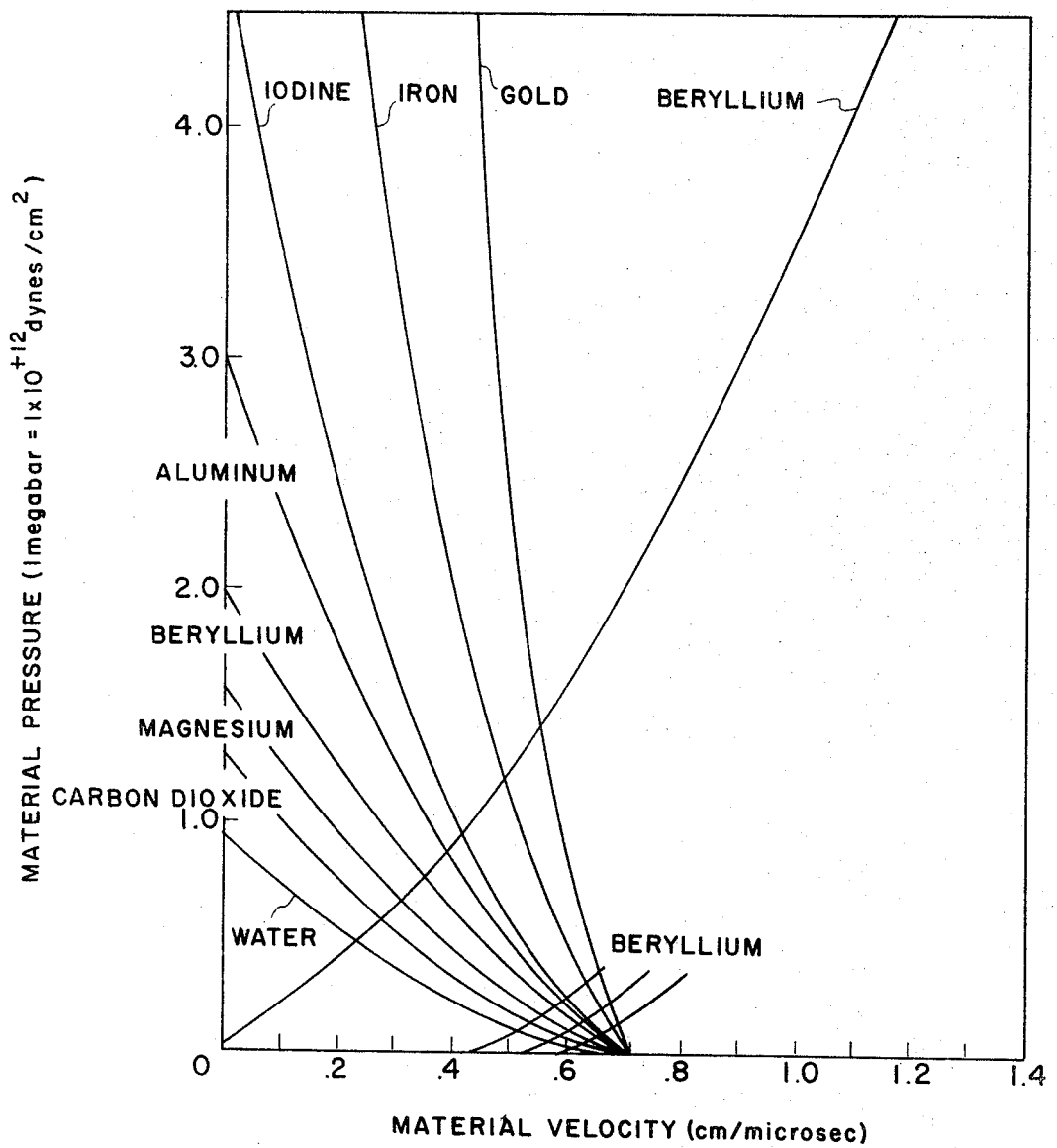
FIG. 16 is a graph showing the intersection of the beryllium Hugoniot with the Hugoniots of various other materials.

Using the graphical techniques developed to answer these concerns, the beryllium Hugoniot is plotted starting at pressure and material velocity equal to zero on FIG. 16. Selecting an arbitrary impact velocity, say $V_p = 0.7$ cm/microsec. to have a definite example, the Hugoniots for gold (19.24 gm/cm³), iron (7.8 gm/cm³), iodine (4.93 gm/cm³), aluminum (2.79 gm/cm³), beryllium (1.85 gm/cm³), magnesium (1.725 gm/cm³), carbon dioxide (1.54 gm/cm³), and water (1.0 gm/cm³) are plotted in a reflected manner starting at pressure equal to zero and material velocity equal to $V_p$. Either by examination of the intersection of the various material Hugoniots with the beryllium Hugoniot or by calculation using equation (9), the following values of $u_{t1}$, $u_{t2}$, and therefore, $u_{fs}$, were obtained and are displayed in the Table of FIG. 17.

When measurements are received from the device such that $u_{fs} > V_p$, the values in the table may be used to determine or bound the impacting particle density. For example, if $u_{fs} = 0.98$ cm/microsec. then the particle must be of a density which is that of iron. For $u_{fs} = 0.78$ cm/microsec., the iodine and aluminum values form an upper and lower bound for $u_{fs}$ and, therefore, the particles density is less than that of iodine but greater than that of aluminum. To obtain a better value of the particle's density additional Hugoniots for materials having densities greater than aluminum but less than iodine may be used.

Considering the second item of interest, it can be noted from FIG. 17 that, for materials down to 1 gm/cm³, in two-shock and expansion wave transits $u_{fs}/V_p > 0.081$.

Although the invention has been described relative to specific embodiments thereof, it is not so limited and the described specifics are for illustration of the principal and are not intended to serve as limitations thereof. Thus, modifications and variations in the specific embodiments described will be readily apparent to those skilled in the art in the light of the above teachings. It is therefore to be understood that within the scope of the appended claims, the invention may be practiced otherwise than as specifically described herein.

What is claimed as new and desired to be secured by Letters Patent of the United States is:

1. A method to determine the density of unknown material particles wherein the closing velocity is known between the impacting particles and a plate of known material comprising:
   determining the material velocity that would be produced in the plate by the unknown material particle of known closing velocity;
   determining the material velocity that would be produced in the plate by various known material particles having the same known closing velocity upon impact with the plate;
   deriving the unknown particle material density by making use of the facts that material velocity in the plate is ordered on impacting particle density alone with all other variables held constant and that similar density impacting particles having the same density produce the same material velocity in the same material plate;
   by comparing the material velocity said unknown particle produced in the known material plate and the material velocities that were produced in the plate by the various known different material particles upon impact;

obtaining a coincidence between the unknown particle material velocity in the plate and a known particle material velocity in the plate; and, measuring the plate material by:

measuring the velocity of material exiting from the plate opposite the particle impact side by recording (with a photomultiplier or photon tube) the initial particle plate impact flash;

starting a time counter;

recording the exiting plate material impact flash on a backstop (with a photomultiplier or photo tube), stopping the time counter, dividing the recorded time into the known distance between plate and backstop to obtain the exiting material velocity and dividing the exiting material velocity by two to obtain the plate material velocity.

2. A method to determine the density of unknown material particles wherein the closing velocity is known between the impacting particles and a plate of known material comprising:

determining the shockwave velocity that would be produced in the plate by the unknown material particle of known closing velocity;

determining the shockwave velocity that would be produced in the plate by various known material particles having the same known closing velocity upon impact with the plate;

deriving the unknown particle material density by comparing the shockwave velocity said unknown particle produced in the known material plate and the shockwave velocities that were produced in the plate by the various known different material particles upon impact;

obtaining a coincidence of the unknown particle shockwave velocity in the plate with a known particle shockwave velocity in the plate;

making use of the facts that shockwave velocity in the plate is ordered on impacting particle density alone with all other variables held constant and that similar density impacting particles having the same density produce the same shockwave velocity in the same plate; and, measuring the shockwave velocity by:

starting a time counter upon recording the impact flash;

recording the impact flash on the plate front surface;

determining the time the shockwave reaches the plate rear surface by recording the impact flash of plate and argon gas; and stopping the time counter, to thereby derive the shockwave velocity by the time it takes to travel from the front to rear surface of a known finite thickness plate.

* * * * *